UNITED STATES PATENT OFFICE.

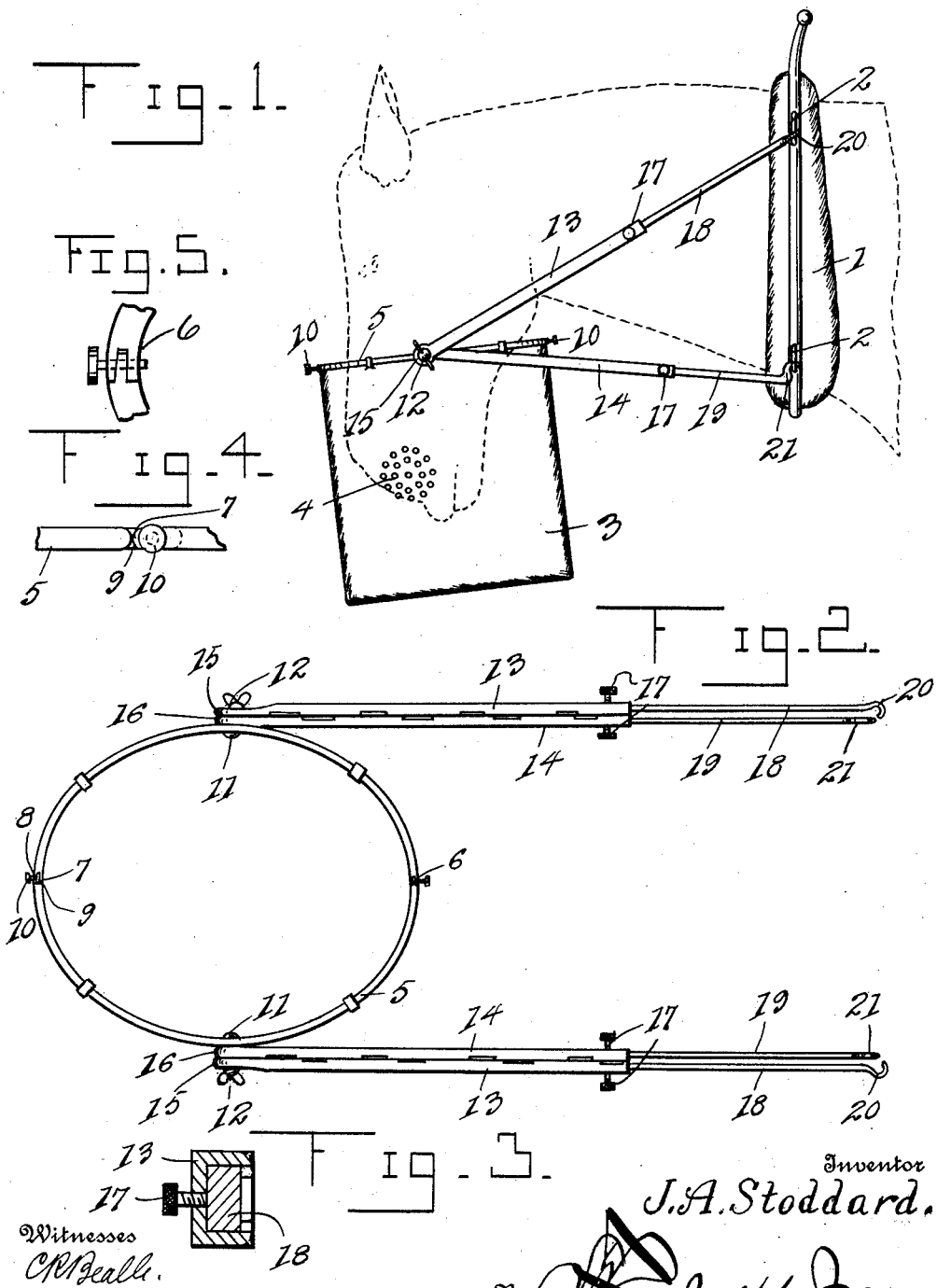

JAMES A. STODDARD, OF BELLEVUE, WASHINGTON.

FEED-BAG FOR HORSES.

1,100,205.  Specification of Letters Patent.  Patented June 16, 1914.

Application filed July 23, 1913. Serial No. 780,822.

*To all whom it may concern:*

Be it known that I, JAMES A. STODDARD, a citizen of the United States, residing at Bellevue, in the county of King and State of Washington, have invented certain new and useful Improvements in Feed-Bags for Horses; and I do hereby declare the following to be a full, clear, and exact description of the invention, such as will enable others skilled in the art to which it appertains to make and use the same.

This invention relates to new and useful improvements in feed bags for horses and has for its object the provision of a feed bag which may be easily and quickly attached to the harness.

Another object of my invention is the provision of a feed bag the weight of which will be distributed over the entire harness and eliminate the necessity of using a strap or other attaching means to the head of the horse.

Still another object of my invention is the provision of a feed bag from which the animal may remove his head without disturbing the feed bag in any way.

A still further object of my invention is the provision of a feed bag which will permit the animal to obtain the entire amount of grain contained therein without any material loss such as usually accompanies the use of the ordinary type of bag.

A further object of my invention is the provision of a device of the above character which is collapsible and may be folded in a compact bundle, in order that the same may be easily transported in a minimum amount of space.

With the above and other objects in view I now proceed to describe my invention in the following specification and accompanying drawings, in which, Figure 1 is a side view in elevation of my improved feed bag, Fig. 2 is a top plan view of Fig. 1, Fig. 3 is an enlarged transverse sectional view of the telescoping members by means of which I attach my improved feed bag, and Fig. 4 is an enlarged detail view of the joint used in the upper supporting ring of my improved feed bag.

Referring to the drawings by characters of reference 1 indicates the usual hame used in the ordinary type of harness having secured thereon the usual rings 2, which are used as guides for reins and the like.

My improved feed bag, indicated by the numeral 3, is preferably provided with the air-holes 4 intermediate its upper edges and its bottom. This bag is preferably supported by a suitable ring 5 which is jointed, as illustrated at 6, and detachably secured to the supporting arm which will be more fully hereinafter described. The joint referred to at 6 is preferably formed at the ends of the two members forming the ring and comprises the two arms 7 and 8, having a transverse aperture which is adapted to register with an aperture in the tongue 9, these apertures being for the reception of the screw threaded shank of a suitable bolt or screw 10. Intermediate the ends of the members composing the ring 5 I preferably provide transversely extending apertures through which the bolt 11 is adapted to extend, this bolt 11 being provided at its opposite extremity with a suitable wing nut 12.

The supporting arms indicated by the numerals 13 and 14, respectively, are preferably tubular in cross section as illustrated in Fig. 3 and are provided at one extremity with the flattened portions 15 and 16, respectively, these flattened portions having transverse apertures extending therethrough which are adapted to receive the shank of the bolt 11 and thereby be held in operative relation with the ring 5. Adjacent the opposite extremity of the tubular members 13 and 14 I preferably provide apertures through which the thumb screws 17 are adapted to extend. Rods 18 and 19 are slidably mounted within the tubular portions 13 and 14, respectively, and are adjustable by means of the thumb screws 17. The ends of the rods 18 opposite the members 13 and 14 are preferably provided with the hooks 20 which are adapted to engage the upper rings on the hame when the device is in place. At the ends of the rods 19 I preferably provide the hooks 21 which are adapted to engage the lower rings on the hame and provide a support for the feed bag when the device is in place.

It will be clearly seen from the foregoing that when it is desired to make use of my improved device the respective rods 18 and 19 are secured in position in the hooks on the hame and may be adjusted to any desired place. The ring 5 formed by the two members is then clamped in the desired position with relation to the rods and the bag filled with the necessary feed. Should it be desired at any time to adjust the feed bag with relation to the head of the horse the only necessary operation is the releasing of the thumb screws 17 and the adjusting of the members 13 and 14, respectively, with relation to the members 18 and 19.

While in the foregoing I have shown and described the preferred embodiment of my invention, I wish it to be understood that I may change the specific arrangements of parts without in any way departing from the spirit and scope of my invention.

What I claim is:—

A device of the character described comprising a jointed ring, said ring being substantially oval and separably connected at diametrically opposite points on its longer axis, said ring being provided with apertures at diametrically opposite points on the shorter axis, bolts adapted to extend through the apertures, wing nuts coöperating with the bolts, a pair of channel bars pivotally mounted on each of said bolts and adapted to be held in adjusted position by the wing nut, a rod slidable in each of said channel bars, set screws carried by the channel bars and adapted to hold the rod in adjusted position, hooks at the free end of each rod, said hooks being adapted to engage the hame of the harness to hold the feed bag rigid, said channel bars being adjustable with relation to the ring to insure the proper position of the ring regardless of the length of extension of the arms.

In testimony whereof I affix my signature in presence of two witnesses.

JAMES A. STODDARD.

Witnesses:
J. H. TEMPLETON,
M. F. WIGHT.

Copies of this patent may be obtained for five cents each, by addressing the "Commissioner of Patents, Washington, D. C."